(12) United States Patent
Thomas

(10) Patent No.: US 6,345,859 B1
(45) Date of Patent: Feb. 12, 2002

(54) ROOF FOR A VEHICLE

(75) Inventor: Peter Thomas, Pforzheim (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 09/654,895

(22) Filed: Sep. 5, 2000

(30) Foreign Application Priority Data

Sep. 3, 1999 (DE) .......................................... 199 41 986

(51) Int. Cl.⁷ .............................. B60J 7/043; B60R 9/04
(52) U.S. Cl. .................................. 296/216.08; 224/326
(58) Field of Search ....................... 296/216.04–216.08; 224/309, 326

(56) References Cited

U.S. PATENT DOCUMENTS 5,540,478 A * 7/1996 Schuch ....................... 296/210

6,012,766 A * 1/2000 Myles .................... 298/203.03

FOREIGN PATENT DOCUMENTS

| DE | 43 44 604 | 12/1994 | | |
|----|-----------|---------|---|---|
| DE | 196 13 761 | 7/1997 | | |
| FR | 2701677 | * | 8/1994 | ................. 296/222 |

* cited by examiner

*Primary Examiner*—Dennis H. Pedder
(74) *Attorney, Agent, or Firm*—Crowell & Moring LLP

(57) ABSTRACT

A roof for a motor vehicle with a stationary, continuous roof element, particularly with at least one movable roof section, which is held movably on a guide rail and the guide rail is connected with a roof pillar and sealed with respect to the latter. The guide rail of the roof or of a roof module in each case is disposed on the inside of the side roof pillar forming the boundary of a roof opening and is connected with the latter. In a recessed channel, longitudinally extending between the side roof spar and the guide rail, a holding rail for a roof-transporting system is disposed.

16 Claims, 2 Drawing Sheets

ROOF FOR A VEHICLE

BACKGROUND AND SUMMARY OF THE INVENTION

This application claims the priority of German patent document 199 41 986.8, filed Sep. 3, 1999, the disclosure of which is expressly incorporated by reference herein.

The invention relates to a roof for a motor vehicle with a stationary continuous roof element.

From the German Patent document DE 196 13 761 C1, a vehicle roof is known, which can be opened and has at least one movable roof part, which is guided movably at guide rails, disposed in a roof opening. The guide rails themselves form part of a frame, which can be inserted from above in the roof opening and can be connected over flanges with lateral roof frames. The guide rails or the frame carrying these has an upwardly directed spar, to which an external frame can be connected, which covers a gap between the roof pillar and the roof parts. Moreover, German Patent Document DE 43 44 604 C1 discloses a vehicle roof with a roof rack which, connected with a molding, can be fastened with screws to the side roof pillar.

It is an object of the invention to provide a stationary, continuous roof element, particularly a roof or roof module for a motor vehicle with at least one movable roof section, which can be inserted easily in a roof opening of the vehicle between roof pillars of the body structure and fastened with holding elements.

Pursuant to the invention, this object is accomplished by using a holding rail for a roof transport system (e.g., luggage support) as part of the assembly holding the roof assembly at vehicle roof side pillars.

Principal advantages achieved with the invention are that, on the one hand, a stationary, continuous vehicle roof or roof module with at least one longitudinally displaceable roof section can be inserted in a roof opening of the vehicle between longitudinal roof pillars and fixed at each side over holding rails to these pillars by means of screws. The holding rail is designed as a profiled supporting rail for such purposes as fixing a transporting system on the roof. Accordingly, this holding rail fulfills the function of holding or fastening the roof module as well as the function of accommodating a transporting system. For this purpose, the guide rails of the roof or the roof module are disposed in each case on the inside of a side roof pillar, which forms the boundary of a roof opening, and are connected with the latter. The holding rail for the roof transporting system is disposed in a channel extending longitudinally between the side roof pillar and the guide rail.

For the purpose of accommodating and fastening the roof module simply in the body structure as well as in the holding rail, the guide rail or a frame for the roof has a spar, which protrudes approximately horizontally towards the outside of the vehicle and is disposed above an accommodation for the roof pillar protruding to the inside of the vehicle. The holding rail as well as the guide rail or the frame are connected by fastening screws with the roof pillar. The guide rail or the holding rail is supported at the accommodation for the roof pillar.

The holding rail can be exchanged without lifting the roof module from the roof pillar. For this purpose, the holding rail with the guiding rail or frame can be connected partly over fastening screws with the roof and partly the roof can be connected over separate fastening screws with the roof pillar.

According to a further special embodiment of the invention, the guide rail or the frame can also be constructed in one part with the holding rail, the roof module then being connected with the side pillars of the roof directly by fastening screws. By these measures, it is achieved that the holding rail and guide rail are one structure. This simplifies installation and dismantling of the roof module.

In order to fix and align the holding rail in the longitudinal direction, the holding rail, at the underside in the region of a spar, has longitudinally extending ribs, which are at a distance from one another and are disposed on the inside of the longitudinally extending ribs on the upper side of the spar of the guiding rail.

In order to ensure that there are no leaks at the screwing points of the holding rails, there is in the fastening region in each case a washer over the screws with a sealing element surrounding the screws.

The holding rail is sealed on the outside over sealing strips, which are disposed in both legs of the holding rail. The sealing strip at one leg abuts against the side roof pillar and the sealing strip on the other leg abuts against the guide rail.

Owing to the fact that the roof module with the movable roof section can be fixed by means of the screws over the holding rail overlapping the spar of the guide rail at the side roof pillar of the vehicle roof at least over the length of the roof opening, a stable fastening of the roof extension structure is achieved, so that, in conjunction with the guide rail, an increased stiffness of the roof frame is achieved. The same holds true also for the roof element, which is connected with a frame or module frame and may consist of transparent or opaque sheet metal or plastic.

Other objects, advantages and novel features of the present invention will become apparent from the following detailed description of the invention when considered in conjunction with the accompanying drawings.

DETAILED DESCRIPTION OF THE DRAWINGS

Figure 1:
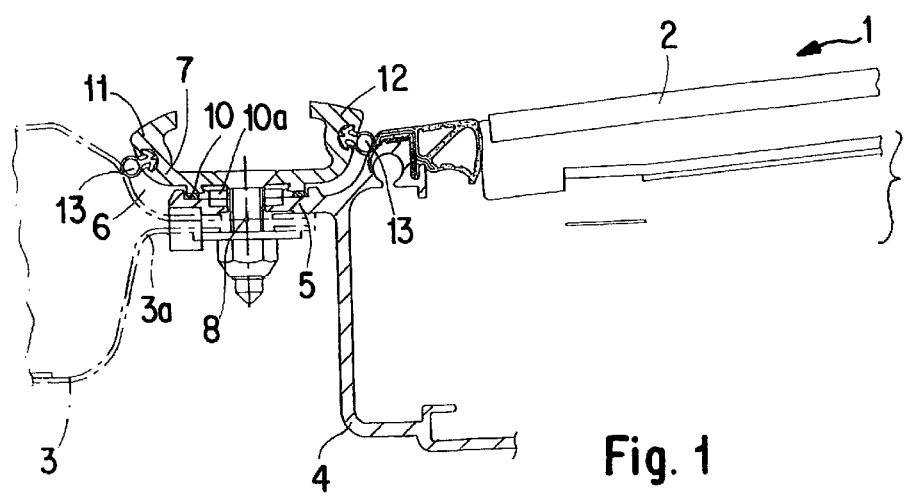
FIG. 1 shows a cross section through a side roof pillar with guide rail, roof section and holding rail, through which a fastening screw passes, constructed according to a preferred embodiment of the present invention.
Figure 1A:
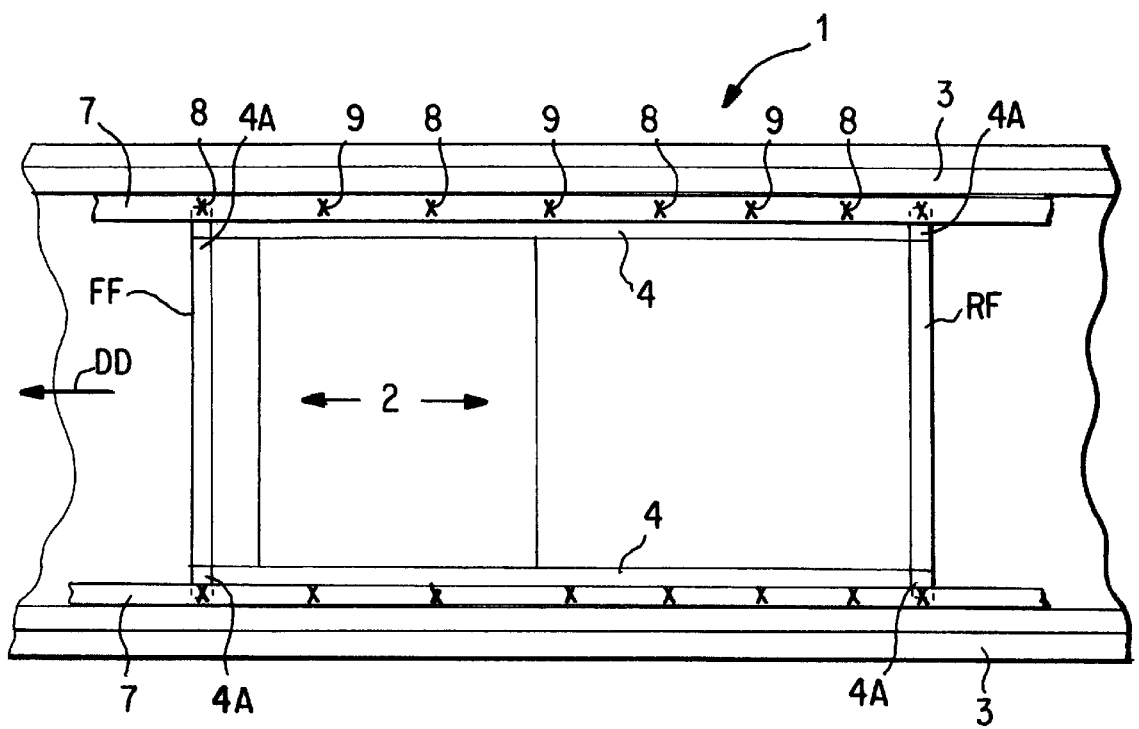
FIG. 1A is a top schematic view of a vehicle roof constructed according to preferred embodiments of the invention.

FIG. 1A schematically depicts a vehicle roof 1 with an opening bordered by front transverse frame member FF, rear transverse frame member RF, and guide rails 4. The forward travel direction is depicted by arrow DD. Side roof pillars 3 extend along the length of the roof laterally outside the sides of the roof opening. This FIG. 1A schematically depicts locations of various features described below with respect to the other drawing figures.

Roof 1 for a motor vehicle has an operative roof module with at least one roof section 2 which can be moved longitudinally. Guide rails 4 for the movable roof section or sections are provided at the insides of the side roof pillars 3. If the roof element is continuous, it is held in a frame, which is connected with the side roof pillars.

The guide rail 4 and the frame 4*a* have a spar 5, which protrudes to the outside of the vehicle, is aligned approximately horizontally and disposed above a spar 3*a* protruding from the side roof pillar 3. Between the side roof pillar 3 and the guide rail 4 or the frame 4*a*, there remains a longitudinally extending recessed channel 6, in which a holding rail 7 for a roof transporting system is disposed. The holding rail 7 protrudes only insignificantly over the roof contour.

At the spar 3*a* of the roof pillar, the spar 5 of the guide rail 4, as well as the holding rail 7 are connected over fastening screws 8, as shown in greater detail in FIG. 1.

Figure 2:
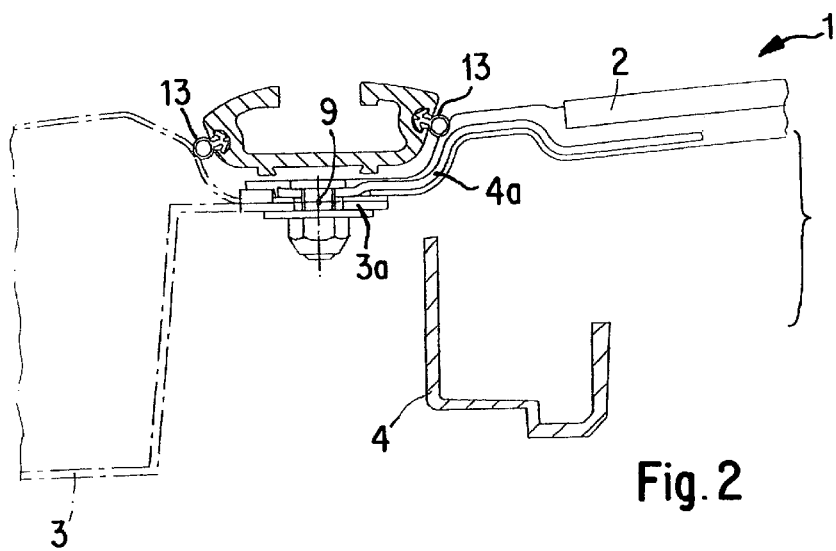
FIG. 2 shows a cross-section through a side roof pillar with a guide rail or frame, roof section and holding rail, through which the fastening screws passes only partly, constructed according to another preferred embodiment of the invention.

The roof opening front and rear transverse members FF and RF include outwardly directed frame parts 4A which are also connected with the spar 3*a* of the roof pillar by fastening screws 9 as shown in detail in FIG. 2.

By means of the holding rail 7, the roof 1 or the roof module is held in a reinforcing manner with the roof sections 2 at the guide rail 4, since the latter is overlapped and connected with the side roof pillar 3.

Figure 3:
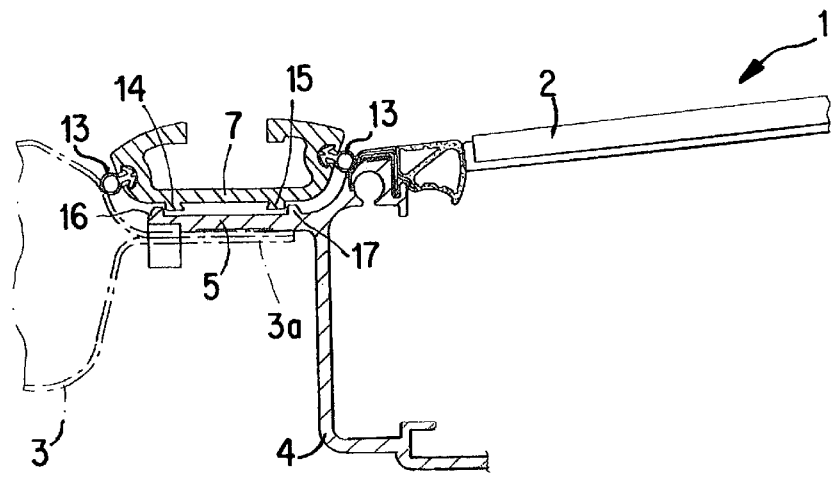
FIG. 3 shows a cross-section through a side roof pillar with guide rail, roof section and holding rail in a region between the fastening screws, constructed according to preferred embodiments of the invention.

The guide rail 4 or the frame 4*a* of the roof module is fastened to the side roof pillar 3 partially with the holding rail 7 by the screws 8 (FIG. 1) and/or the guide rail 4 is fixed only partially by screws 9 directly to the side roof pillar (FIG. 2). The fastening with screws 8 and 9 may, for example, be alternated as schematically depicted in FIG. 1A. Between the screws 8, 9, the holding rail 7 may be disposed at a slight distance from the spar 5 of the guide rail 4 as schematically depicted in FIG. 3.

In order to seal the fastening region of the screw 8, a washer 10 may be provided between the holding rail 7 and the spar 5 of the guide rail 4. The washer 10, has a seal, which surrounds the screw 8 and is supported, on the one hand, at the spar 5 and, on the other, at the holding rail 7 in a sealing manner. Moreover, at the holding rail 7, particularly at its legs 11, 12, in each case a sealing strip 13 is held, which rests against the side roof spar 3 as well as against the guide rail 4.

The holding rail 7 is constructed, for example, as a C-shaped profile and, on the underside, has longitudinally extending ribs 14, 15, which are spaced apart and integrally molded within longitudinally extending, outside ribs 16, 17 at the spar 5 of the guide rail 4.

The guide rail 4 or the frame 4*a* can also be constructed so that the holding rail 7 is part of the spar 5 and the guide rail 4 or the frame 4*a* is constructed in one piece with the holding rail 7.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A roof assembly comprising:
   a pair of roof side pillars extending in a longitudinal direction of a vehicle roof,
   a roof opening disposed between the roof side pillars,
   a movable roof section disposed in the roof opening when in a roof opening closing position,
   a pair of guide rails for the movable roof section disposed at opposite lateral sides of the roof opening between the roof opening and respective ones of the roof side pillars, said guide rails being connected to respective adjacent roof side pillars, and
   a pair of holding rails for a roof transporting system, said holding rails being disposed in respective recessed channels extending longitudinally along opposite sides of the roof opening between respective ones of the side pillars and guide rails;
   wherein the holding rails open upwardly and have downwardly protruding spaced apart ribs which position the holding rails at upwardly extending ribs of a facing guide rail spar.

2. The roof assembly according to claim 1,
   wherein the movable roof section is connected with a frame wherein the frame with the movable roof is connected with side roof pillars of the body structure via the holding rails.

3. The roof assembly of claim 1,
   wherein the guide rail has a spar which protrudes horizontally laterally away from the roof opening and is disposed above a spar formed on the adjacent side roof pillar, which protrudes toward the roof opening, and
   wherein the holding rail is connected by fastening screws with the guide rail spar and the side roof pillar spar.

4. The roof assembly of claim 1, further comprising,
   a frame,
   wherein the frame includes front and rear transverse frame members at respective opposite longitudinal ends of the roof opening, said frame members including spar sections protruding horizontally laterally away from the roof opening to be disposed above respective protruding spars formed on the adjacent side roof pillars and protruding toward the roof opening, and
   wherein fastening screws connect respective frame member spars and side roof pillar spars together.

5. The roof assembly of claim 4,
   wherein the guide rail has a spar which protrudes horizontally laterally away from the roof opening and is disposed above a spar formed on the adjacent side roof pillar, which protrudes toward the roof opening, and
   wherein the holding rail is connected by fastening screws with the guide rail spar and the side roof pillar spar.

6. The roof assembly according to claim 1, wherein the guide rails have spars extending laterally way from the roof opening,
   wherein the side roof pillars have spars extending laterally toward the roof opening,
   wherein the guide rail spars and the side roof pillar spars overlap one another along the length of the roof opening, and
   wherein the holding rails extend along and above the overlapping spars of the guide rails and the side roof pillars.

7. The roof assembly of claim 6, wherein fastening screws connect the holding rails to the overlapping spars of the guide rails and the side roof pillows.

8. The roof assembly of claim 6, wherein fastening screws connect the overlapping spars of the guide rails and the side roof pillar spars without connecting with the holding rails.

9. The roof assembly of claim 7, wherein fastening screws connect the overlapping spars of the guide rails and the side roof pillar spars without connecting with the holding rails.

10. The roof assembly of claim 1, wherein the respective guide rails and holding rails at one side of the roof opening are formed in one piece, each of said one-piece guide rail and holding rail being connected by screws to a respective roof side pillar.

11. The roof assembly of claim 1, wherein the holding rails are clamped by fastening screws on top of protruding spars of the roof side pillars.

12. The roof assembly of claim 11, wherein washers with sealing elements surround the fastening screws.

13. The roof assembly of claim 1, wherein the holding rails have a C-shaped profile which opens upwardly with one leg extending along the adjacent guide rail and the other leg extending along the adjacent roof side pillar, and wherein sealing strips are disposed in said legs which abut the adjacent guide rail and side roof pillar when said holding rail is attached to a spar of the respective side roof pillar.

14. A roof for a motor vehicle with at least one movable roof section which is held movably on a guide rail, which is connected with a side roof pillar spar, wherein a holding rail is used as a directly reinforcing fastening element for the roof;

wherein the holding rail opens upwardly and has downwardly protruding spaced apart ribs which position the holding rail at upwardly extending ribs of a facing guide rail spar.

15. A roof for a motor vehicle with a stationary, continuous roof element, which is connected with a frame, wherein the frame with the roof is connected with side roof pillars of the body structure via a holding rail;

wherein the holding rail opens upwardly and has downwardly protruding spaced apart ribs which position the holding rail at upwardly extending ribs of a facing guide rail spar.

16. A vehicle roof assembly comprising:

a roof with a roof opening, a movable roof section disposed in the roof opening closing position, a guide rail for the movable roof section disposed at a lateral side of the roof opening, said guide rail having a laterally extending guide rail spar, a holding rail for a roof transporting system, said holding rail being disposed in a recessed channel of the roof which extends longitudinally along a side of the roof opening between the guide rail and a lateral side of the roof, wherein the holding rail opens upwardly and has downwardly protruding spaced apart ribs which position the holding rail at upwardly extending ribs of a facing guide rail spar.

* * * * *